J. C. McEWEN.
FRUIT-PICKER.
No. 182,840. Patented Oct. 3, 1876.
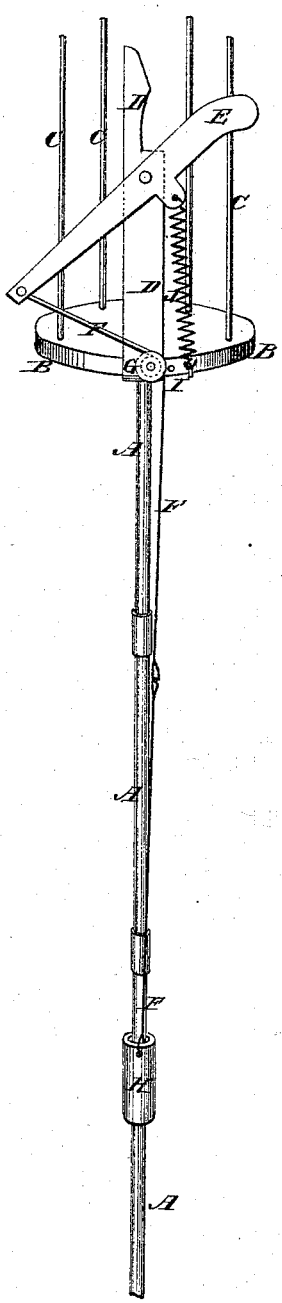
WITNESSES:
Francis McArdle.
John Goethals
INVENTOR:
J. C. McEwen
BY
ATTORNEYS.

UNITED STATES PATENT OFFICE.

JOSEPH C. McEWEN, OF LEESBURG, FLORIDA.

IMPROVEMENT IN FRUIT-PICKERS.

Specification forming part of Letters Patent No. 182,840, dated October 3, 1876; application filed May 22, 1876.

*To all whom it may concern:*

Be it known that I, JOSEPH C. McEWEN, of Leesburg, Sumter county, Florida, have invented a new and Improved Fruit-Picker, of which the following is a specification:

The figure is a perspective view of my improved implement.

The object of this invention is to furnish an implement designed especially for clipping oranges from the tree and lowering them to the ground without injuring them, but which may also be used with equal advantage for gathering other fruit.

The invention consists in an improved fruit-picker, formed of the handle, the disk, the circle of wires, the stationary blade, the pivoted blade, the cord or wire, the guide-pulley, and the spiral spring, as hereinafter fully described.

A represents a pole or staff, ten feet, more or less, in length, and which may be made in one piece, or in sections coupled together, so that its length may be regulated as required. To the upper end of the handle A is attached a circular disk, B, to the upper side of which, near its edge, is attached a circle of wires, C, of such a length that the tubular receptacle formed by said wires may contain one, two, three, or four oranges, as may be desired. To the edge of the disk B is attached a steel plate, D, having a concave edge formed upon its upper part. To the stationary blade D, a little below its edge, is pivoted the movable blade E, which has a convex edge formed upon its upper part, and to the lower end of which is attached a wire or cord, F, which passes around a grooved pulley, G, pivoted to the edge of the disk B. The lower end of the wire or cord F may pass through keepers attached to the handle A, or it may be attached to a tubular handle, H, sliding upon the handle A. The latter construction is most convenient, as it keeps the lower end of the wire or cord always in place, and in a convenient position to be operated. The wire or cord F is kept in place upon the grooved pulley G by a pin, I, inserted in the edge of the disk B, as shown in the drawing.

The blade E is provided with a coiled spring, J, to draw it back after clipping the fruit.

Having thus described my invention, I claim as new and desire to secure by Letters Patent—

In a fruit-picker, the combination of wires C, fastened at lower end to a disk, B, and free at the other to admit the twigs between them, with the shears D E, arranged, as shown and described, so that the fruit is allowed to rest in the picker before the stem is excised.

JOSEPH CAMERON McEWEN.

Witnesses:
J. W. BEADLES,
A. DYCHES.